United States Patent
Foad et al.

(10) Patent No.: US 8,431,911 B2
(45) Date of Patent: Apr. 30, 2013

(54) HDD PATTERN APPARATUS USING LASER, E-BEAM, OR FOCUSED ION BEAM

(75) Inventors: Majeed A. Foad, Sunnyvale, CA (US); Stephen Moffatt, St. Lawrence (JE)

(73) Assignee: Applied Materials, Inc., Santa Clara, CA (US)

( * ) Notice: Subject to any disclaimer, the term of this patent is extended or adjusted under 35 U.S.C. 154(b) by 489 days.

(21) Appl. No.: 12/759,587

(22) Filed: Apr. 13, 2010

(65) Prior Publication Data
US 2010/0258758 A1 Oct. 14, 2010

Related U.S. Application Data

(60) Provisional application No. 61/168,870, filed on Apr. 13, 2009.

(51) Int. Cl.
| | |
|---|---|
| *A61B 6/00* | (2006.01) |
| *G01N 21/64* | (2006.01) |
| *G11B 5/02* | (2006.01) |
| *G11B 21/02* | (2006.01) |
| *G11B 11/00* | (2006.01) |
| *G03G 13/00* | (2006.01) |
| *G03G 19/00* | (2006.01) |

(52) U.S. Cl.
USPC ............ 250/487.1; 250/492.22; 250/580; 250/582; 250/583; 369/13.02; 360/55; 360/75; 430/31; 430/39

(58) Field of Classification Search ........... 250/103.1, 250/271, 487.1, 482.1, 492.1, 492.2, 492.22; 250/580, 582, 583; 360/17, 55, 59, 75, 97.11, 360/131, 135; 369/13.01–13.05, 13.24, 13.25; 430/19, 21, 31, 39, 140, 644
See application file for complete search history.

(56) References Cited

U.S. PATENT DOCUMENTS

| 4,935,278 A | 6/1990 | Krounbi et al. |
| 5,858,474 A | 1/1999 | Meyer et al. |

(Continued)

FOREIGN PATENT DOCUMENTS

| JP | 2009026435 A | 2/2009 |
| JP | 2009205777 A | 9/2009 |
| KR | 20090011519 | 2/2009 |

OTHER PUBLICATIONS

International Search Report and Written Opinion Mailed Nov. 26, 2010, in PCT Application PCT/US2010/030823.

(Continued)

*Primary Examiner* — Bernard E Souw
(74) *Attorney, Agent, or Firm* — Patterson & Sheridan, LLP (57) ABSTRACT

A method and apparatus for manufacturing magnetic storage media is provided. A structural substrate is coated with a magnetically active material, and a magnetic pattern is formed in the magnetically active material by treating portions of the material with energy from a laser, e-beam, or focused ion beam. The beam may be divided into a packet of beamlets by passing the beam through a divider, which may be a diffraction grating for laser energy, a thin film single crystal for electrons, or a perforated plate for ions, or the beam may be generated by an array of emitters. The beamlets are then focused to a desired dimension and distribution by optics or electric fields. The resulting beam packet may be shaped further by passing through an aperture of any desired shape. The resulting beam may be applied sequentially to exposure zones to treat an entire substrate or plurality of substrates.

9 Claims, 8 Drawing Sheets

U.S. PATENT DOCUMENTS

| | | | |
|---|---|---|---|
| 5,991,104 A | 11/1999 | Bonyhard | |
| 5,993,937 A | 11/1999 | Birukawa et al. | |
| 6,055,139 A | 4/2000 | Ohtsuka et al. | |
| 6,086,961 A | 7/2000 | Bonyhard | |
| 6,153,281 A | 11/2000 | Meyer et al. | |
| 6,168,845 B1 | 1/2001 | Fontana, Jr. et al. | |
| 6,368,425 B1 | 4/2002 | Segar et al. | |
| 6,377,414 B1 | 4/2002 | Wang | |
| 6,383,574 B1 | 5/2002 | Han et al. | |
| 6,414,808 B1 * | 7/2002 | Allenspach et al. | 360/55 |
| 6,602,620 B1 | 8/2003 | Kikitsu et al. | |
| 6,731,446 B2 | 5/2004 | Ikeda et al. | |
| 6,744,583 B2 | 6/2004 | Ikeda et al. | |
| 6,749,904 B1 | 6/2004 | Liu et al. | |
| 6,781,779 B2 | 8/2004 | Arita et al. | |
| 6,864,042 B1 | 3/2005 | Kuo et al. | |
| 6,898,031 B1 | 5/2005 | Belser et al. | |
| 6,950,260 B2 | 9/2005 | Coffey et al. | |
| 7,038,225 B2 | 5/2006 | Kuo et al. | |
| 7,435,514 B2 | 10/2008 | Hyde et al. | |
| 7,465,478 B2 | 12/2008 | Collins et al. | |
| 7,501,638 B1 | 3/2009 | Zhou | |
| 7,670,529 B2 * | 3/2010 | Choi et al. | 264/293 |
| 2003/0019739 A1 | 1/2003 | Shibamoto et al. | |
| 2003/0129850 A1 | 7/2003 | Olgado et al. | |
| 2004/0259036 A1 * | 12/2004 | Chappert et al. | 430/311 |
| 2006/0044946 A1 | 3/2006 | Phillips | |
| 2007/0132152 A1 * | 6/2007 | Choi et al. | 264/401 |
| 2008/0218772 A1 * | 9/2008 | Binns et al. | 356/622 |
| 2009/0117475 A1 | 5/2009 | Hyde et al. | |
| 2009/0130573 A1 | 5/2009 | Hyde et al. | |
| 2010/0053813 A1 | 3/2010 | Fukushima et al. | |
| 2010/0165504 A1 * | 7/2010 | Fukushima et al. | 360/75 |
| 2010/0221583 A1 * | 9/2010 | Foad et al. | 428/846 |
| 2010/0258431 A1 * | 10/2010 | Moffatt et al. | 204/192.11 |

OTHER PUBLICATIONS

International Search Report and Written Opinion of the International Searching Authority mailed Sep. 15, 2010 in PCT/US2010/024163.

Krakow, W., et al., Multiplexing electron Beam Patterns Using Single Crystal Thin-Films, J. Phys. E.: Sci. Instrum., vol. 12, pp. 984-988, 1979.

* cited by examiner

FIG. 6

HDD PATTERN APPARATUS USING LASER, E-BEAM, OR FOCUSED ION BEAM

CROSS-REFERENCE TO RELATED APPLICATIONS

This application claims benefit of U.S. Provisional Patent Application Ser. No. 61/168,870, filed Apr. 13, 2009, and incorporated by reference herein.

FIELD

Embodiments of the invention relate to hard-disk drive media, and apparatus and methods for making hard-disk drive media. More specifically, embodiments of the invention relate to methods and apparatus for forming a patterned magnetic medium for a hard-disk drive.

BACKGROUND

Hard-disk drives are the storage medium of choice for computers and related devices. They are found in most desktop and laptop computers, and may also be found in a number of consumer electronic devices, such as media recorders and players, and instruments for collecting and recording data. Hard-disk drives are also deployed in arrays for network storage.

Hard-disk drives store information magnetically. The disk in a hard-disk drive is configured with magnetic domains that are separately addressable by a magnetic head. The magnetic head moves into proximity with a magnetic domain and alters the magnetic properties of the domain to record information. To recover the recorded information, the magnetic head moves into proximity with the domain and detects the magnetic properties of the domain. The magnetic properties of the domain are generally interpreted as corresponding to one of two possible states, the "0" state and the "1" state. In this way, digital information may be recorded on the magnetic medium and recovered thereafter.

The magnetic medium in a hard-disk drive is generally a glass, composite glass/ceramic, or metal substrate, which is generally non-magnetic, with a magnetically susceptible material deposited thereon. The magnetically susceptible layer is generally deposited to form a pattern, such that the surface of the disk has areas of magnetic susceptibility interspersed with areas of magnetic inactivity. The non-magnetic substrate is usually topographically patterned, and the magnetically susceptible material deposited by spin-coating or electroplating. The disk may then be polished or planarized to expose the non-magnetic boundaries around the magnetic domains. In some cases, the magnetic material is deposited in a patterned way to form magnetic grains or dots separated by a non-magnetic area.

Such methods are expected to yield storage structures capable of supporting data density up to about 1 TB/in$^2$, with individual domains having dimensions as small as 20 nm. Where domains with different spin orientations meet there is a region referred to as a Bloch wall in which the spin orientation goes through a transition from the first orientation to the second. The width of this transition region limits the areal density of information storage because the Bloch wall occupies an increasing portion of the total magnetic domain.

To overcome the limit due to Bloch wall width in continuous magnetic thin films the domains can be physically separated by a non-magnetic region (which can be narrower than the width of a Bloch wall in a continuous magnetic thin film). Conventional approaches to creating discrete magnetic and non-magnetic areas on a medium have focused on forming single bit magnetic domains that are completely separate from each other, either by depositing the magnetic domains as separate islands or by removing material from a continuous magnetic film to physically separate the magnetic domains. A substrate may be masked and patterned, and a magnetic material deposited over exposed portions, or the magnetic material may be deposited before masking and patterning, and then etched away in exposed portions. In either case, the topography of the substrate is altered by the residual pattern of the magnetic regions. Because the read-write head of a typical hard-disk drive may fly as close as 2 nm from the surface of the disk, these topographic alterations can become limiting. Thus, there is a need for a process or method of patterning magnetic media that has high resolution and does not alter the topography of the media, and an apparatus for performing the process or method efficiently for high volume manufacturing.

SUMMARY

Embodiments of the invention provide a method of forming a magnetic recording substrate, comprising modifying the magnetic properties of portions of a magnetically active layer of the magnetic recording medium by exposing those portions to patterned energy directed toward the substrate with energy selected to modify the magnetic properties without substantially modifying the shape of the substrate surface.

Other embodiments provide an apparatus for modifying the magnetic properties of a substrate, comprising a work surface, a source of directed energy facing the work surface, a patterning divider disposed between the energy source and the work surface, and a rectifier disposed between the patterning divider and the work surface.

Other embodiments provide an apparatus for modifying the magnetic properties of a substrate, comprising an energy source for producing laser, e-beam, or focused ion energy carriers, wherein the average energy carrier has energy between about 0.2 keV and about 50 keV, a moveable work surface facing the energy source, wherein the work surface is moveable in one or more directions under the control of a controller and one or more positioners coupled to the work surface, a divider disposed between the energy source and the work surface, the divider having a plurality of substantially identical apertures spaced in a regular pattern and shaped to transform incident energy from the energy source into a plurality of substantially identical beamlets, and a rectifier disposed between the divider and the work surface, the rectifier configured to focus and direct the beamlets toward the work surface in a pattern having a desired dimension and distribution.

BRIEF DESCRIPTION OF THE DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments of the invention generally provide apparatus and methods for processing magnetic media substrates for hard disk drives. The apparatus and methods modify the magnetic properties of the substrate by applying focused and patterned energy to the substrate to create magnetic domains with different properties detectable and changeable by a magnetic head. The magnetic domains are separately addressable by a magnetic head held in proximity to the substrate surface, enabling the magnetic head to detect and affect the magnetic properties of an individual magnetic domain. Embodiments of the invention create magnetic domains having a dimension less than about 50 nm, with some embodiments creating domains of dimension less than 25 nm or 10 nm, while preserving the topography of the substrate. Such resolution is expected to yield storage densities in excess of 1 TB/in$^2$.

The substrates used are generally metal or glass, and may be metal alloys or composite glass substances such as glass/ceramic blends. The substrates are generally coated with a magnetically active material that provides a medium for magnetic patterning. The magnetically active material may be formed in multiple layers, each layer having the same or different composition. The magnetically active material may be formed with or without an initial magnetic susceptibility. In one embodiment, a first layer of soft magnetic material, such as iron or and iron/nickel alloy, is formed over the base substrate, and a second layer of magnetic material, such as a cobalt/nickel/platinum alloy, is formed over the first layer. These layers may be formed by any suitable method known to the art, such as physical vapor deposition, or sputtering, chemical vapor deposition, plasma-enhanced chemical vapor deposition, spin-coating, plating by electrochemical or electroless means, and the like.

In an embodiment wherein the magnetically active layer has an initial magnetic susceptibility, the magnetic susceptibility of portions of the magnetically active layer may be reduced or eliminated to create the magnetic pattern. In an embodiment wherein the magnetically active layer has no initial magnetic susceptibility, portions of the layer may be internally aligned so that they acquire a magnetic susceptibility to create the magnetic pattern. In the latter type of embodiment, the magnetically active material may be formed with an amorphous internal structure that has no magnetic susceptibility. Such a material may be treated according to embodiments described herein to create domains having a desired level of magnetic susceptibility.

Following formation of a magnetic pattern in the magnetically active material, described in more detail below, a protective layer is formed over the magnetically active layer to prevent contact between the magnetic head and the magnetic medium. The protective layer is preferably magnetically inactive, and in some embodiments comprises carbon, such as amorphous or diamond-like carbon, or carbon nitride. The protective layer is also generally very thin, such as less than about 10 nm in thickness.

A lubricating layer may be formed over the protective layer to protect the magnetic head in the event of contact between the head and the substrate. The lubricating layer may be a lubricious polymer, such as a fluoropolymer, and may be deposited by any convenient method. The lubricating layer will also generally be thin, such as less than about 50 nm in thickness.

Embodiments of the invention provide methods and apparatus for establishing a magnetic pattern in one or more surfaces of a hard disk medium through application of focused patterned energy in the form of laser energy, e-beam energy, or focused ions. The energy may be used to modify the magnetic properties of treatment areas of the substrate, either increasing or decreasing magnetic susceptibility of the treatment areas.

Figure 1:
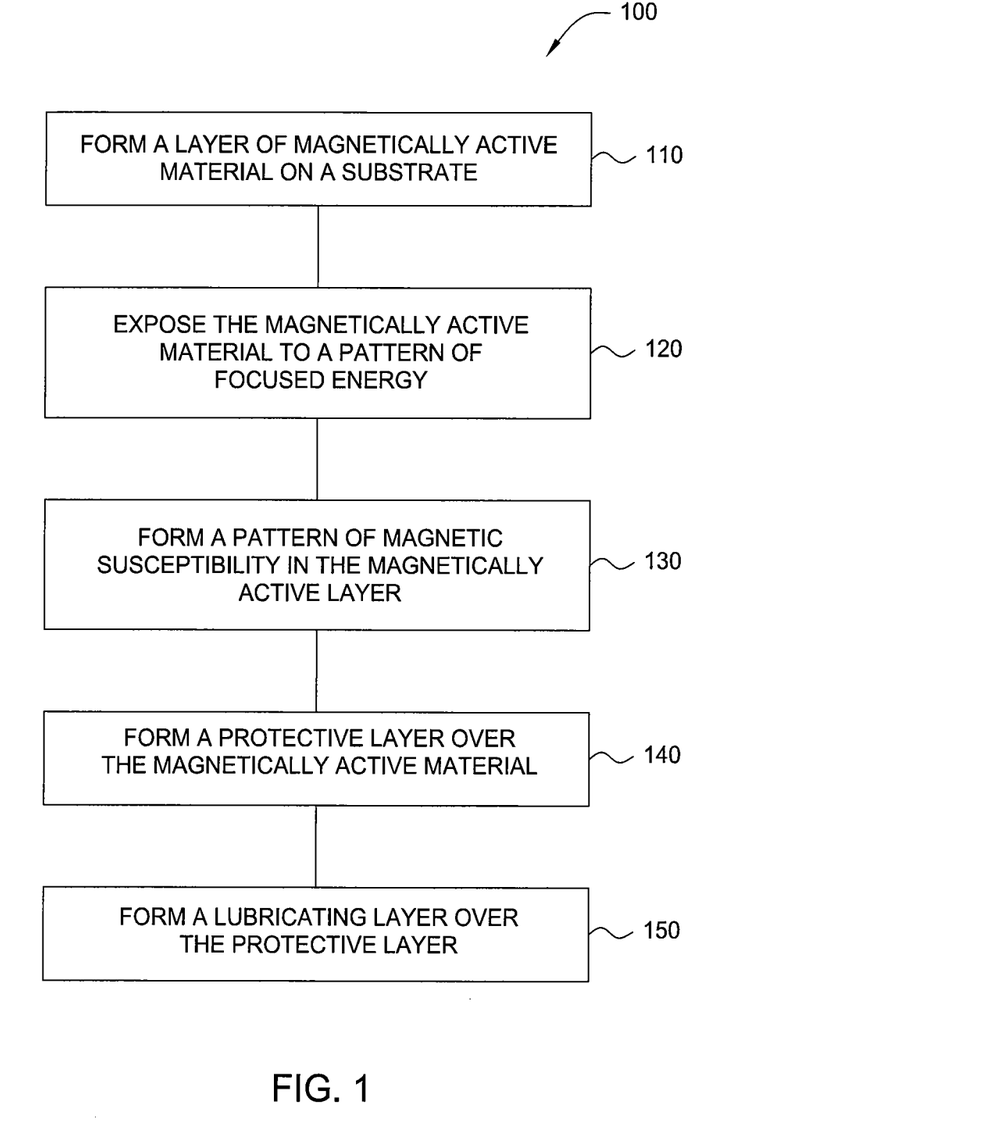
FIG. 1 is a flow diagram summarizing a method according to one embodiment.

FIG. 1 is a flow diagram summarizing a method 100 according to one embodiment. A layer of magnetically active material is formed on a hard drive substrate at 110. The hard drive substrate is generally a structurally strong material such as metal, glass, ceramic, or a combination thereof. Many substrates feature an aluminum or glass base layer, but other embodiments may feature carbon composite materials. The substrate provides structural strength and good adhesion to the magnetically active layer, and is generally magnetically impermeable with diamagnetic, or only very weak paramagnetic, properties. For example, in some embodiments, the magnetic susceptibility of the base layer is below about $10^{-4}$ (the magnetic susceptibility of aluminum is about $1.2\times10^{-5}$).

The magnetically active layer may be formed from one or more ferromagnetic materials. In some embodiments, the layer comprises a plurality of layers having the same or different composition. In one embodiment, the layer comprises a first layer and a second layer, wherein the first layer is a soft magnetic material, which is generally defined as a material with low magnetic coercivity, and the second layer has higher coercivity than the first layer. In some embodiments, the first layer may comprise iron, nickel, platinum, or combinations thereof. In some embodiments, the first layer may comprise a plurality of sub-layers having the same or different compositions. The second layer may also comprise a variety of materials, such as cobalt, chromium, platinum, tantalum, iron, terbium, gadolinium, or combinations thereof. The second layer may also comprise a plurality of sub-layers having the same or different compositions.

In one embodiment, the magnetically active layer comprises a first layer of iron or iron/nickel alloy having a thickness between about 100 nm and about 1,000 nm (1 μm) and a second layer comprising two sub-layers, each having a thickness between about 30 nm and about 70 nm, such as about 50 nm, and each comprising chromium, cobalt, and platinum. The thickness of the magnetically active layer is generally scaled to the dimension of the magnetic patterning to be formed in the layer. In many embodiments the magnetically active layer will have a thickness no more than about five times a maximum dimension of the magnetic domains.

The magnetically active layer may be formed with or without a net magnetism or magnetic susceptibility. An amorphous layer will not exhibit any magnetic properties while amorphous, but may be made to exhibit magnetic properties by ordering all or part of the layer. A magnetically active layer formed with crystal or matrix structure will exhibit magnetic properties on some scale, which may be modified by treatment with energies of various forms.

At 120, the magnetically active material is exposed to a pattern of focused energy. The focused energy may be delivered by laser, e-beam, or focused ions in a single beam or resolved into a pattern. A single beam energy source may be resolved into a pattern using electromagnetic devices such as optical or electrostatic lenses or diffraction devices. In one embodiment, a single beam is passed through a diffraction grating to multiplex the beam, and the multiplexed beam may then be rectified by passing through a lens to form a rectilinear pattern of beams. The single beam energy source may be a deep-UV or x-ray laser or e-beam operating at wavelengths from about 10 nm to about 1 pm. In one aspect, laser energy having at least about 1 eV per photon may be focused to a space having dimension at least about one-quarter the wavelength of the laser light with acceptable resolution. For example, a hypothetical 200 nm laser may be focused to a 50 nm space to treat a spot on a substrate. Laser power will generally range between about 0.1 J/cm$^2$ and about 1.0 J/cm$^2$. In one aspect, an array of microscopic laser emitters, such as a laser diode array, may be used to emit a plurality of patterned laser beamlets, as described further in connection with FIG. 6.

At 130, a pattern of magnetic susceptibility is formed in the magnetically active layer by exposure to the patterned energy. Portions of the magnetically active layer exposed to the energy undergo modification of their magnetic properties. In some embodiments, magnetic susceptibility is increased by exposure to the energy as crystal domains condense from the amorphous phase. In one example, an amorphous layer of magnetically active material having minimal bulk magnetic susceptibility is exposed for a time period between about 1 and about 3 seconds to an e-beam having energy per electron between about 5 keV and about 50 keV focused to a width between about 1 nm and about 20 nm to condense a crystal phase having width between about 5 nm and about 25 nm and depth of about 10 nm to about 50 nm from an amorphous layer approximately 50 nm thick. Such an e-beam may be directed through a pattern formation device, which may be a single crystal thin film material or focusing device. The material used for dividing an e-beam generally has a lattice structure suitable for bending electrons having the energy desired for a particular application or embodiment. In some embodiments, for example, a thin film gold matrix may be used. In other examples, metals such as silver, copper, platinum, palladium, nickel, or other metals having a close-packed cubic crystal structure (i.e. isomorphic unit cell structure), may be readily chosen for their different unit cell dimensions to use with electrons having different energies. In other embodiments, magnetic susceptibility may be decreased by exposure to the energy as magnetic alignment is randomized by thermal processes. Locally heating portions of a magnetically susceptible to a temperature above the Curie temperature, for example, will reduce or eliminate magnetic susceptibility of the exposed portion.

In one example, an ordered layer of magnetically susceptible material is exposed to a beam of focused ions. Ions may be produced by a conventional ion beam generator, and may be focused by electrostatic means into a beam of any desired shape or dimension. A beam of ions may be multiplexed into a pattern of beamlets by passing the ions through a pattern grating and then passing the beamlets through structured electric fields to focus them to a desired dimension and distribution. For example, an ion plasma may be passed through a square grating of dimension 20 cm×20 cm, with each grating aperture a square of dimension 0.1 μm ×0.1 μm separated from each neighboring aperture by a distance of 0.1 μm. to form 10 billion ion beamlets, which may be focused by electric fields into a patterned ion beam of dimension 1 cm×1 cm, with each beamlet having dimension of about 50 nm/50 nm and separation distance of about 50 nm. In another embodiment, a pattern of ion beamlets may be produced by a field of nanoscopic ion emitters formed in an array. An intense electric field, in some embodiments exceeding 1 V/nm, or even 1,000 V/nm, formed near the ion emitters ionizes material at the surface of the emitters to produce ions.

At 140, a protective layer is formed on the substrate over the magnetically active layer. The protective layer prevents interaction of the magnetically active surface with any materials that might degrade its properties, such as oxygen or moisture. The protective layer may also be a sealing layer in some embodiments. In some embodiments, the protective layer may comprise carbon, may comprise carbon and nitrogen, may be a carbon and nitrogen containing layer, may be an amorphous carbon layer, or may be a carbon nitride layer. In other embodiments, the protective layer may be a polymer, which may comprise carbon. In some embodiments, the protective layer may be a plastic or thermoplastic material. The protective layer is generally deposited in a low temperature process to avoid altering the magnetic properties of the magnetically active layer.

At 150, a lubricating layer is formed over the substrate. The lubricating layer provides protection for a magnetic device (not shown) configured to detect and change the magnetic properties of regions on the magnetically active surface of the substrate. In the event of contact between the magnetic device and the substrate surface, the lubricating layer will minimize frictional forces on the magnetic device that may damage the device. In some embodiments, the lubricating layer may be a polymer, a carbon containing polymer, a fluorine containing polymer, a fluorine and carbon containing polymer, a fluoropolymer, a crystalline layer, or a diamond-like carbon layer. The lubricating layer is generally also deposited in a low temperature process to avoid altering magnetic properties of the substrate.

Figure 2A:
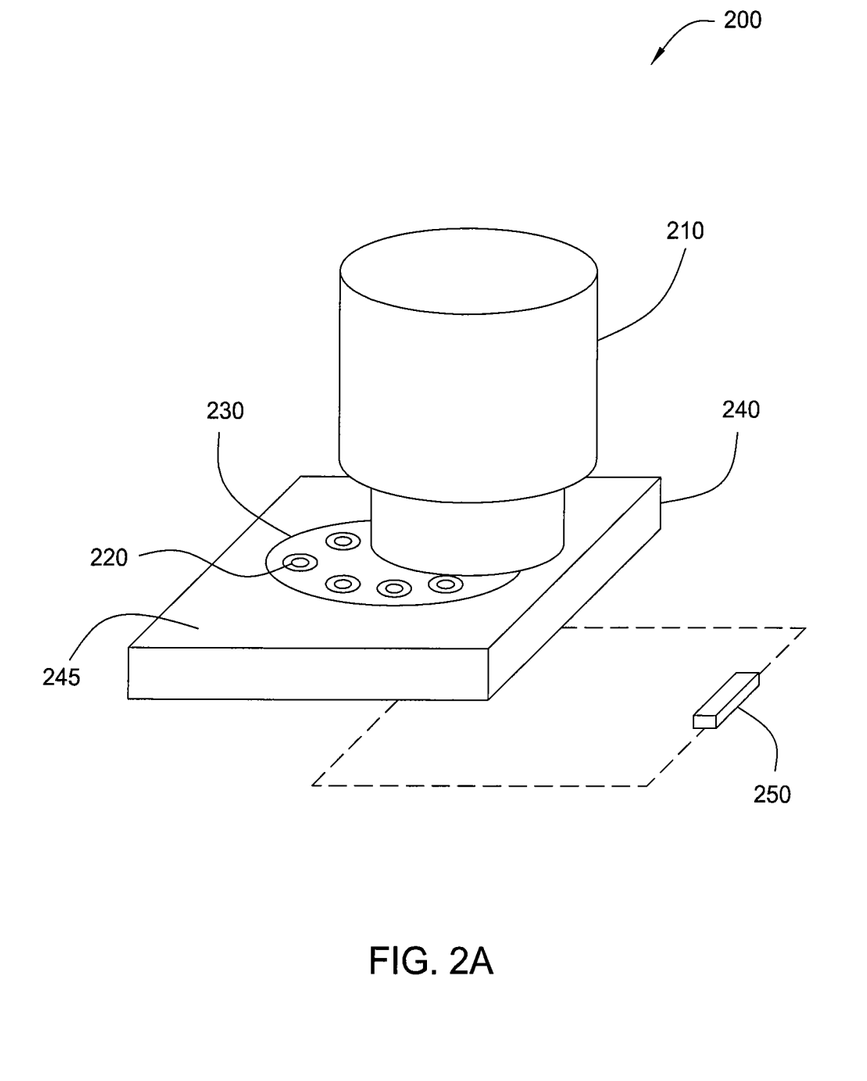
FIG. 2A is a schematic perspective view of an apparatus according to another embodiment.

FIG. 2A is a schematic perspective view of an apparatus 200 for performing magnetic patterning of a substrate. An energy generator 210 is positioned proximate a work table 240 having a substrate carrier 230 with a plurality of substrates 220 disposed on a work surface 245 of the work table 240. The energy generator 210 and work surface 245 are moveable in one or two dimensions with respect to one another. In one embodiment, the work table 240 and work surface 245 are moveable in one or two dimensions to allow positioning the substrates 220 to be processed by the energy generator 210. Movement of the work table is controlled by a controller 250, configured to detect the position of the work table 240 in one or two dimensions, and actuate one or more positioners for positioning the work table 240 at desired locations according to one or more dimensional parameters. In another embodiment, the energy generator 210 is moveable in one or two dimensions to position the emitted energy with respect to the work surface 245 and the substrates disposed thereon. In yet another embodiment, both the work table 240 and the energy generator 210 are moveable in one or two dimensions. In all embodiments, the movement is controlled by one or more controllers for precise positioning of the emitted energy and the substrates disposed on the work table 240 with respect to each other.

Figure 2B:
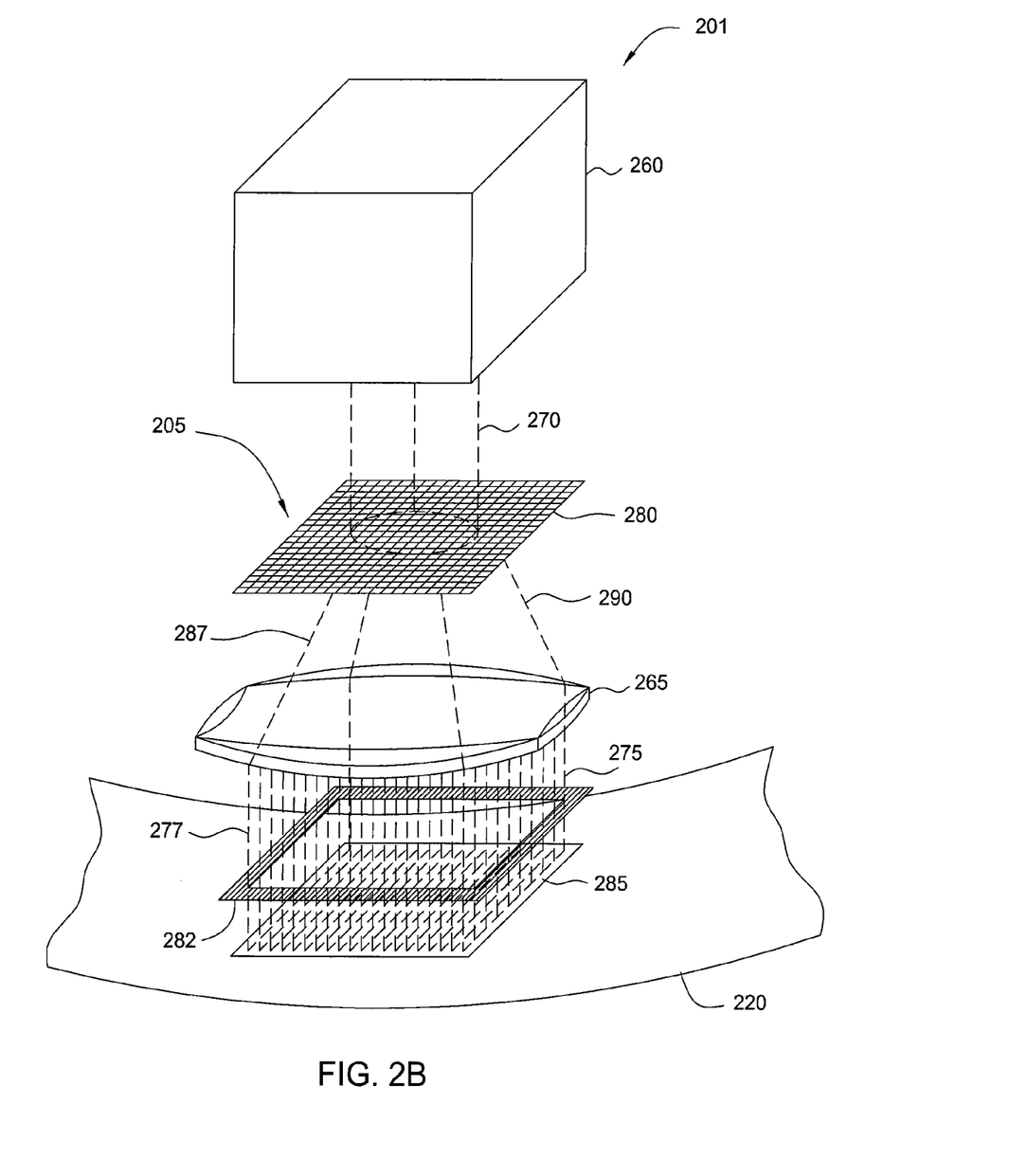
FIG. 2B is a detail perspective view of a portion of the apparatus of FIG. 2A.

The energy generator 210 may be a laser or e-beam generator. Embodiments comprising an ion beam generator are described below. FIG. 2B is a medium-scale detail view of the apparatus 200 showing the beam formation and multiplexing assembly 201 not visible in FIG. 2A. The assembly 201 comprises an energy source 260 and a beam shaping assembly 205. The beam shaping assembly 205 comprises a divider 280, a rectifier 265, and optionally an aperture 282. The laser beam or e-beam 270 emerges from the energy source 260 and impinges on the divider 280. The divider 280 may be diffraction grating of any suitable dimension, or a beam multiplier, configured to divide the beam into a beam packet 287 comprising a desired number of beamlets 290 distributed in a pattern. In this embodiment, the beamlets 290 are depicted distributed into a square grid pattern. The beam packet 287 is passed through the rectifier 265 to form a rectified beam packet 277 comprising a plurality of rectified beamlets 275, and to direct the beamlets 275 toward an exposure area 285 on the surface of the substrate 220. The rectifier 265 may be an optical lens for laser embodiments, or an electrostatic lens for e-beam embodiments. The beam passes through the optional aperture 282 to block desired portions of the rectified beam packet 277. In some embodiments, the rectified beam packet 277 may not have uniform intensity distribution due to edge effects in the divided beam packet 287. The aperture 282 may be useful to block beamlets having non-uniform intensity.

Figure 2C:
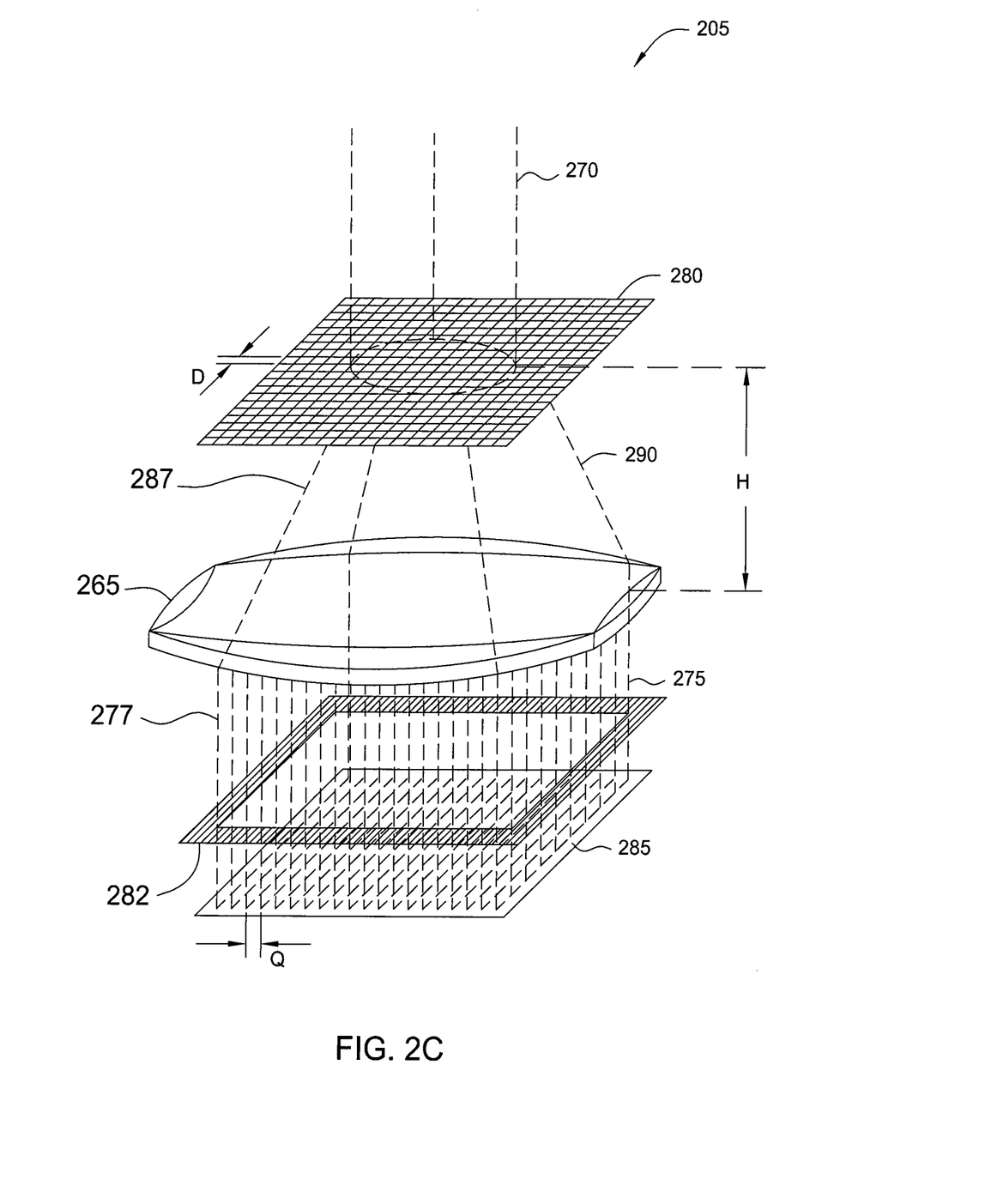
FIG. 2C is a maximum detail view of a portion of the apparatus of FIG. 2A.

FIG. 2C is a maximum detail view of the beam shaping assembly 205. The divider 280 is depicted as a diffraction grating having a square characteristic and aperture periodicity D, distance H from the rectifier 265, and beamlet spread Q at the exposure area. Depending on the wavelength of energy incident on the beam shaping assembly 205, the periodicity D and distance H may be adjusted to provide the desired beamlet spread Q among the rectified beamlets 275. For example, if the incident energy 270 is deep UN energy having a wavelength of about 10 nm, a diffraction grating having periodicity of about 0.1 mm disposed a height of 1 mm above a rectifier such as a lens may be expected to produce a pattern having beamlet spread of about 100 nm. Energy having shorter wavelengths may be divided using single crystal films to provide beamlet spreads with smaller resolution.

Figure 3:
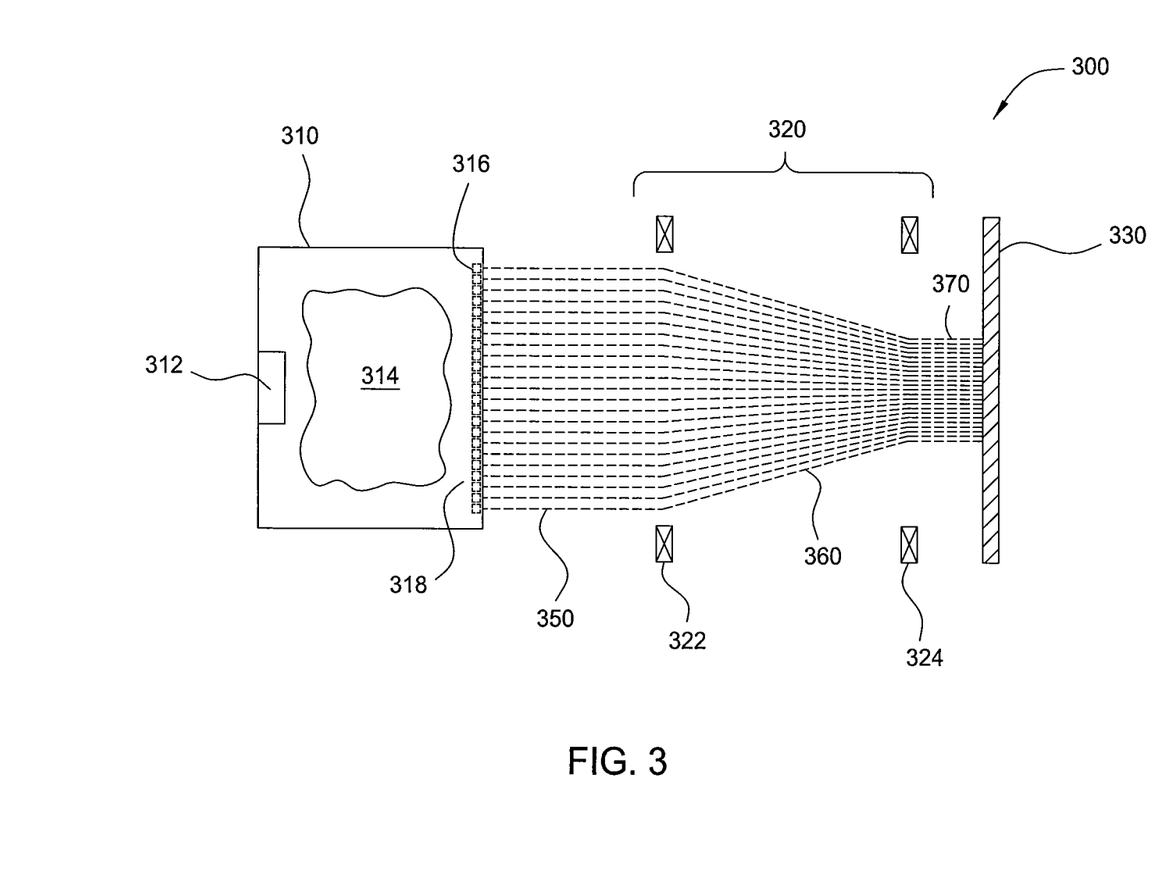
FIG. 3 is a schematic side view of an apparatus according to another embodiment.

FIG. 3 is a schematic side view of an apparatus 300 for treating a substrate 330 with a patterned focused ion beam 370. The apparatus 300 comprises an ion beam packet generator 310, and a beam forming column 320. The ion beam packet generator 310 generally comprises an ion source 312, which generates a plasma 314 within the ion beam packet generator 310. A perforated plate 316 allows the plasma 314 to exit the generator 310 in a packet of defined beamlets 350. In some embodiments, the ion beam packet generator 310 may be a showerhead, and the perforations 318 may have any desired shape and distribution. In one embodiment, the perforations 318 are square, and are distributed in a square grid. The beamlets packet 350 comprises a plurality of ion beams having a desired dimension, distribution, and current density. The beamlet packet 350 is focused by the beam forming column 320, which comprises a focusing electrode 322 and a rectifying electrode 324. The focusing electrode 322 reduces the dimension and spread of the beamlet packet 350 to form a converging beamlet packet 360. The rectifying electrode 324 forms the converging beamlet packet 360 into a patterned focused ion beam 370 comprising a plurality of beamlets having dimension, spread, and current density proportional to the dimension, spread, and current density of the original beamlet packet 350.

The energy applied to a substrate by each energy carrying unit, photon or ion, is generally in a range between about 0.2 keV and about 50 keV, such as between about 1.0 keV and about 2.5 keV or between about 10 keV and about 50 keV, for example between about 1.8 keV and about 2.0 keV or between about 20 keV and about 30 keV. In general, the energy is selected to change the magnetic properties of exposed portions of the substrate without changing the topography of the substrate. Ions are directed toward the substrate with enough energy to alter the magnetic properties of the substrate, or implant into the substrate surface, but below the energy required to etch the substrate surface. Thus, ions are generally non-reactive, and may be selected from the group consisting of helium, argon, neon, hydrogen, and combinations or mixtures thereof. Ion implantation may be effective for treating relatively thick magnetically active layers, such as greater than about 70 nm thick, because thicker magnetically active layers generally require modification deeper into the layer to achieve a discernable difference between treated areas and untreated areas. For thinner layers, lower energy treatment may suffice to generate a discernable difference. In some embodiments, the energy is selected to excite thermal motion of atoms in the magnetically active layer sufficient to trigger organization of the atoms into a crystal structure in the affected areas to form a magnetically susceptible domain or a magnetic domain having a net magnetic moment. In other embodiments, the energy is selected to excite thermal motion to disrupt alignment of magnetic moments in the treated area, reducing or eliminating magnetic moment and/or magnetic susceptibility.

For magnetically susceptible domains formed by exposure to patterned energy, a dimension of the domains may be controlled by adjusting duration of exposure to the patterned energy, intensity of the patterned energy, and ambient temperature of the substrate. Incident energy at the substrate surface propagates in a generally spherical pattern through the substrate. Areas heated to a threshold temperature undergo structural change from an amorphous morphology to a crystalline morphology. As energy propagates into the substrate, the extent of the area heated to the threshold temperature grows, and the magnetic domain formed thereby also grows. A higher ambient temperature of the substrate will accelerate propagation of the critical temperature front through the substrate matrix because the heating required to reach the critical temperature is reduced.

Figure 4:
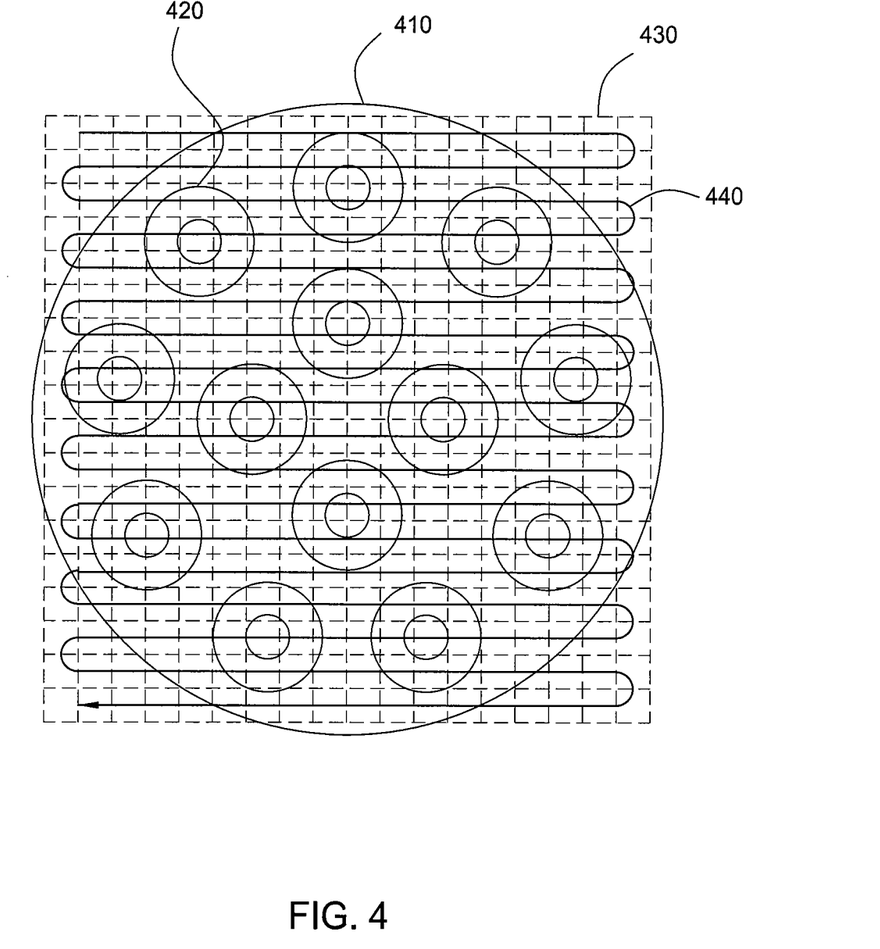
FIG. 4 is a plan view of a substrate group illustrating a treatment method according to another embodiment.

In embodiments featuring directed energy such as lasers, e-beams, or focused ion beams, substrates are generally treated by sequentially exposing portions of the substrate surface according to a treatment pattern. FIG. 4 is a plan view of a substrate carrier 410 with a plurality of substrates 420 disposed thereon for processing according to embodiments described herein. An imaginary grid 430 is superimposed over the substrate carrier 410 and substrates 420 to represent possible treatment zones for a treatment apparatus generating a grid treatment pattern. The treatment zones are generally treated sequentially according to a predetermined pattern 440 governed by a controller. In an embodiment wherein the substrate carrier is positioned on a moveable stage, the controller moves the stage according to the pattern, positioning the stage with each treatment zone, in turn, in an exposure position. In some embodiments, precise positioning of the substrate carrier 410 and substrates 420 on the carrier may enable the programmed pattern to avoid exposing zones that do not fall at least partially on a substrate, maximizing the incidence of substrate processing, and thereby maximizing throughput. In other embodiments, a reflectivity detector may be used to detect the different reflectivity of substrates 420, the substrate carrier 410, and the surrounding work surface (not shown in FIG. 4).

Figure 5A:
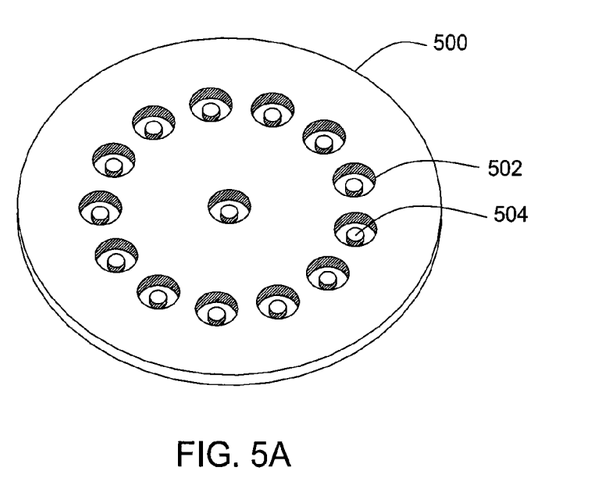
FIG. 5A is a perspective view of a substrate carrier according to one embodiment.
Figure 5B:
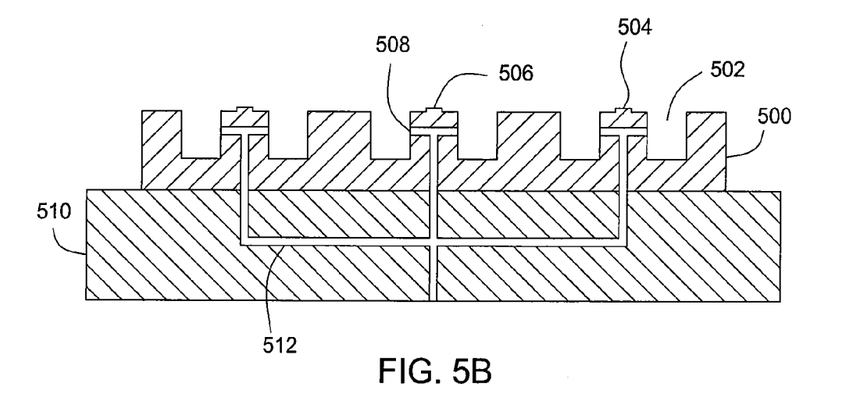
FIG. 5B is a cross-sectional view of a substrate carrier according to another embodiment.

FIGS. 5A and 5B are schematic illustrations of a substrate carrier 500 according to an embodiment of the invention. FIG. 5A shows the substrate carrier 500 in a perspective view, and FIG. 5B shows the substrate carrier 500 coupled to a support 510. The substrate carrier 500 has a plurality of substrate sites 502 for disposing substrates thereon. In the embodiment of FIG. 5A, the substrate sites 502 are illustrated as recessed areas of the carrier 500. Each substrate site 502 has a contact portion 504 for stabilizing the substrate. The substrate will generally rest on the contact portion 504, and extend outward toward the rim of the recessed site 502, creating a cavity beneath the substrate.

FIG. 5B illustrates the carrier 500 in cross-section coupled to a support 510. The contact portion 504 has an extension 506 for mating with an opening at the center of a substrate. The carrier 500 also has a plurality of conduits 508 disposed through the contact portions 504. The conduits 508 are in fluid communication with conduits 512 similarly disposed in the support 510. The conduits 512 and 508 provide means for applying a thermal control medium, such as a heating or cooling medium, to the cavity beneath each substrate disposed in a substrate site 502. For processes described herein which may require cooling of substrates, a cooling gas may be provided to the back side of the substrates through the conduits 512 and 508. In one embodiment, modifying the magnetic surface of the substrates may raise their temperature to a level sufficient to degrade the resist material or threaten the integrity of the magnetic layer. In such an embodiment, the substrate may be cooled during processing by applying a cool non-reactive gas, such as helium, argon, hydrogen, or nitrogen, to the substrate.

In an alternate embodiment of a substrate carrier, the substrate sites may be projections above the otherwise flat surface of the carrier. The projections may be shaped to mate with openings in the substrates such that the substrates are held above the flat surface of the carrier. The projections may comprise conduits similar to those described above for thermal control of the back side of each substrate.

In the substrate carrier of FIG. 5B, the conduits 508 are illustrated as projecting outward from the contact portion 504 at a 90° angle from a major axis of the contact portion 504. In alternate embodiments, the conduits 508 may be fitted with nozzles to shape or direct the flow of a thermal control medium in any desired way. For example, nozzles may divert the thermal control medium at an upward angle toward the substrate. In an alternate embodiment, the conduits 508 may be formed having an upward angle to direct a thermal control medium toward the substrate. In many embodiments, a heating or cooling gas may be used for thermal control with the substrate carrier of FIG. 5B.

It should be noted that the energy required to modify the magnetic properties of a magnetically active layer depend largely on the thickness of the layer. For a relatively thick layer, more modification of magnetic properties deeper into the substrate is required to yield a measurable difference between treated and untreated areas. For a thin layer, however, a measureable difference may arise from modification of magnetic domains one or two deep beneath the surface. For thin layers, low energy treatment may be attractive, and energies may be so low that ions and photons do not penetrate more than about 5 atomic layers beneath the layer surface. For example, ions may have enough energy to impact the substrate surface with energy between that required to reorient magnetic domains near the surface and that required to implant into the surface.

Because detecting the difference in magnetic properties between the modified and unmodified regions becomes more difficult with distance, thickness of the protective layer and lubricating layer formed over the magnetically active layer must be modulated to the overall specification of the substrate. As the area of the modified and unmodified regions shrinks, the magnitude difference in magnetic properties declines as well, so layers covering the magnetically active layer must be made thinner to allow a read/write head to detect the different domains. In general, thickness of all layers covering the magnetically active layer totals no more than about ten times the maximum width of the modified and unmodified regions of the magnetically active layer. For a pattern resolution of 10 nm, for example, the thickness of layers covering the magnetically active layer totals about 100 nm or less. In general, the thickness of the protective layer will be equal to or greater than the thickness of the lubricating layer. Thus, for example, if a substrate has a pattern resolution of 5 nm or less, the protective layer may have a thickness between about 30 nm and about 40 nm, while the lubricating layer has a thickness between about 10 nm and about 20 nm.

Figure 6:
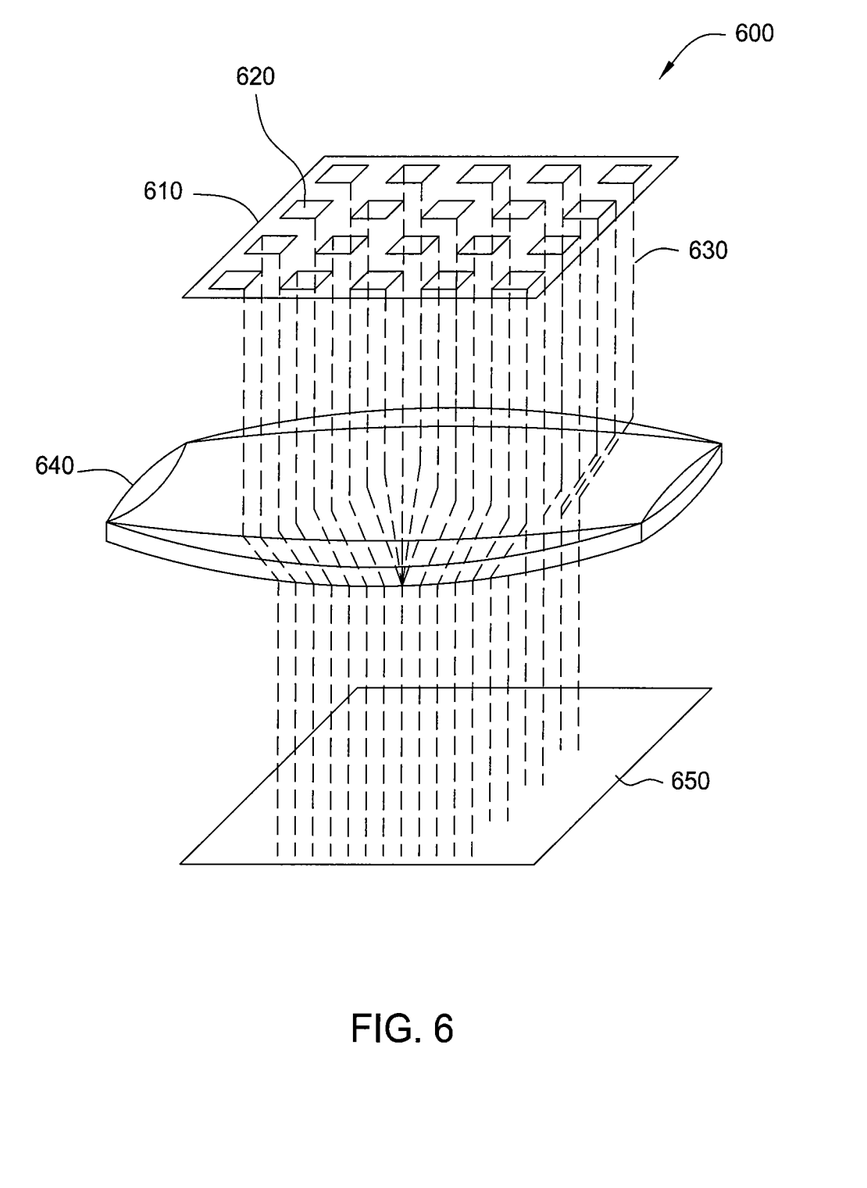
FIG. 6 is a schematic perspective view of an apparatus according to another embodiment.

FIG. 6 is a schematic perspective view of an apparatus 600 according to another embodiment. The apparatus of FIG. 6 employs a field emitter 610 comprising a plurality of energy sources 620, and a focus member 640. Each energy source 620 emits a stream of energy 630, which may be a continuous beam or discrete packets, toward the focus member 640. The focus member 640, which may be an optical lens, electromagnetic lens, electro-optical lens, or magneto-optical lens, focuses the plurality of energy streams 630 into a desired area and directs the energy streams 630 toward a substrate 650. As described elsewhere herein, the substrate 650 will generally have a magnetically active layer disposed thereon, which may or may not have magnetic domains established. The energy directed toward the substrate will be selected to crystallize magnetic domains from an amorphous layer or reduce magnetic susceptibility of a layer having magnetic domains. In this regard, the emitters may be microlaser emitters, such as laser diodes, or field electron emitters. Such emitters may be formed using standard lithographic techniques, or, for smaller emitters, nanoimprint techniques as described elsewhere herein. The apparatus of FIG. 6 may be used as described in connection with FIG. 4 to expose an entire substrate to a desired form of energy.

For laser embodiments, the wavelength of light used will depend on the size of domains to be exposed by each beamlet. In general, features can be resolved at about one-fourth to one-eighth the wavelength of light used to illuminate them. Thus, magnetic domains of about 50 nm or greater may be exposed to deep UV (e.g. about 300 nm) light with acceptable resolution to define reasonably precise domain boundaries. Smaller features require shorter wavelength light or focused particles. Examples of deep UV light sources include KrF and ArF excimer or exciplex laser emitting at 248 nm and 193 nm respectively. In photon applications, the patterned energy is generally developed into one or more spots or beamlets, each of which has a core energy density between about 10 mJ/cm$^2$ and about 500 mJ/cm$^2$, such as about 50 mJ/cm$^2$. Exposure time for each exposed region will be between about 30 nsec and about 1 msec, such as about 50 nsec. Beamlets may be formed from a single beam of laser light by diffraction, as described herein, or a field of beamlets may be generated using an array of field emitters, such as deep-UV laser diodes. Examples of such laser diodes include the various types of metal nitride photodiodes.

In one aspect, the energy sources 620 may be electron emitters formed by depositing a thin metal layer over a dielectric and patterning the resulting substrate to create metal-capped columns. A perforated sheet conductor (not shown in FIG. 6) is disposed such that each perforation is close to a metal cap, and an electric potential is applied to the sheet conductor. The electric potential generates an electric field, which for emission applications is generally about 1 V/nm or greater. The intense electric field attracts electrons from the metal caps and directs them through the perforations to form a plurality of beamlets. In another aspect, the energy sources 620 may be ion emitters formed by depositing a thin film comprising a material to generate ions over a dielectric material and patterning to create columns. A perforated sheet conductor is similarly used to generate an intense electric field that ionizes the material at the tops of the columns to generate the ions.

Embodiments of the invention may apply to, and incorporate, various types of magnetic recording media. For, example, recording media having a granular magnetic structure may be manufactured. Also, multi-layered magnetic thin films may be used. A magnetic thin film that is also a continuous magnetic film may be used with patterned media. In one embodiment, the magnetic thin film may be made of highly anisotropic magnetic material, suitable for a thermally assisted magnetic recording.

Substrates processed according to methods described herein will generally have a magnetically active layer with domains having identifiably different magnetic properties from neighboring domains. In one aspect, the magnetically active layer will have amorphous domains and crystalline domains, which may be polycrystalline. The amorphous domains will have no identifiable magnetic activity, whereas the crystalline domains may exhibit magnetic susceptibility or coercivity, or may even have a magnetic field. The crystalline domains will have an average dimension along the surface of the substrate that is not more than about 50 nm, such as between about 5 nm and about 50 nm, such as not more than about 25 nm, such as between about 5 nm and about 25 nm. The crystalline domains will be separated by an average distance that is not more than about 50 nm, such as between about 5 nm and about 50 nm, such as not more than about 25 nm, such as between about 5 nm and about 25 nm.

While the foregoing is directed to embodiments of the invention, other and further embodiments of the invention may be devised without departing from the basic scope thereof.

What is claimed is:

1. An apparatus for modifying a magnetic property of a substrate, comprising:
    a work surface;
    a source of directed energy facing the work surface;
    a patterning divider disposed between the energy source and the work surface; and
    a rectifier disposed between the divider and the work surface.

2. The apparatus of claim 1, wherein the energy source is a laser, the patterning divider is a diffraction grating, and the rectifier is an optical lens.

3. The apparatus of claim 1, wherein the energy source is an e-beam, the patterning divider is a thin film single crystal, and the rectifier is an electrostatic lens.

4. The apparatus of claim 1, wherein the energy source is an ion generator, the patterning divider is a perforated plate, and the rectifier is an electrostatic column.

5. The apparatus of claim 1, further comprising an aperture disposed between the rectifier and the work surface.

6. The apparatus of claim 1, wherein the work surface is movable in at least one dimension under the control of a controller.

7. The apparatus of claim 2, wherein the laser operates at a wavelength of about 300 nm or shorter.

8. An apparatus for modifying the magnetic properties of a substrate, comprising:
    an energy source for producing laser, e-beam, or focused ion energy carriers with average energy density between about 10 mJ/cm$^2$ and about 500 mJ/cm$^2$;
    a work surface facing the energy source, wherein at least one of the work surface and the energy source is moveable in one or more directions under the control of one or more controllers and one or more positioners coupled to the work surface, the energy source, or both;
    a divider disposed between the energy source and the work surface, the divider having a plurality of substantially identical apertures spaced in a regular pattern and shaped to transform incident energy from the energy source into a plurality of substantially identical beamlets; and
    a rectifier disposed between the divider and the work surface, the rectifier configured to focus and direct the beamlets toward the work surface in a pattern having a desired dimension and distribution.

9. The apparatus of claim 8, further comprising an aperture disposed between the rectifier and the work surface, the aperture being shaped to produce the desired pattern of beamlets.

* * * * *

UNITED STATES PATENT AND TRADEMARK OFFICE
CERTIFICATE OF CORRECTION

| | | |
|---|---|---|
| PATENT NO. | : 8,431,911 B2 | Page 1 of 1 |
| APPLICATION NO. | : 12/759587 | |
| DATED | : April 30, 2013 | |
| INVENTOR(S) | : Foad et al. | |

It is certified that error appears in the above-identified patent and that said Letters Patent is hereby corrected as shown below:

In the Specifications:

In the Description:

Column 7, Line 35, please delete "UN" and insert --U/V-- therefor.

Signed and Sealed this
Eighteenth Day of June, 2013

Teresa Stanek Rea
*Acting Director of the United States Patent and Trademark Office*